United States Patent [19]
Hamdan

[11] Patent Number: 5,500,117
[45] Date of Patent: Mar. 19, 1996

[54] CYCLONE-TURBINES, INTENDED ESPECIALLY FOR FLOTATION SYSTEMS DESIGNED FOR TREATING WATER POLLUTED BY HYDROCARBONS

[76] Inventor: Adnan Hamdan, 32, boulevard de la Paix, 64000 Pau, France

[21] Appl. No.: 957,049

[22] Filed: Oct. 2, 1992

[30] Foreign Application Priority Data

Oct. 3, 1991 [FR] France ................................. 91 12197
Nov. 28, 1991 [FR] France ................................. 91 14721

[51] Int. Cl.⁶ ........................... B01D 21/26; B01D 17/00
[52] U.S. Cl. ..................... 210/512.1; 210/519; 209/210; 209/725; 415/182.1; 415/203; 415/208.1
[58] Field of Search .................................. 210/109, 122, 210/195.1, 202, 208, 219, 221.1, 319, 221.2, 320, 512.1, 519, 540; 209/144, 169, 211; 415/182.1, 203, 208.1

[56] References Cited

U.S. PATENT DOCUMENTS

| 2,274,658 | 3/1942 | Booth . | |
| 3,951,816 | 4/1976 | Bascope et al. | 210/514 |
| 4,721,562 | 1/1988 | Barnscheidt et al. | 210/221.2 |
| 4,990,246 | 2/1991 | Blazejzak et al. | 210/195.1 |
| 5,104,520 | 4/1992 | Maronde et al. | 210/512.3 |

FOREIGN PATENT DOCUMENTS

| 2605898 | 4/1986 | France . |
| 3808154 | 9/1989 | Germany . |
| 810521 | 3/1959 | United Kingdom . |

*Primary Examiner*—Robert A. Dawson
*Assistant Examiner*—David Reifsnyder

[57] ABSTRACT

A cyclone-turbine of the stator-rotor type comprising a rotor with mobile blades inside the cage of a stator with fingers of rectangular section, characterized in that a throttling disk is positioned between the cage of the stator and the stack above the cyclone-turbine.

3 Claims, 2 Drawing Sheets

CYCLONE-TURBINES, INTENDED ESPECIALLY FOR FLOTATION SYSTEMS DESIGNED FOR TREATING WATER POLLUTED BY HYDROCARBONS

BACKGROUND OF THE INVENTION

The present invention pertains to an improved cyclone-turbine, intended especially for devices for the separation by flotation of nonmiscible liquids. The invention focuses more specifically on the treatment of water polluted by hydrocarbons.

It is known to treat such mixtures of water and hydrocarbons by flotation either with dissolved air (D.A.F. systems, "dissolved air flotation") or with induced air or gas (I.A.F. systems, "induced air flotation"). In I.A.F. devices, the induction of air or gas is generated either by means of injectors or by means of rotor-stator type turbines. The device in accordance with the present invention pertains to this latter category. Thus, flotation devices of the I.A.F. type are known which operate by means of turbine-induced injection of air or gas, which devices are constituted of a cylindrical tank with one or more passive zones in which the tranquilization or decantation of the oils takes place, and with one or more active zones in which a rotor/stator unit operates as a flotation-air injection device, and which discharge into one or more collector chambers receiving a froth formed in the active compartments. Information on these devices can be found in the manufacturers' bulletins and in various patents, e.g., French Patent No, 2,605,898.

The role of the turbines is to induce, via rotation of the rotor, a depression in the stack above them, thereby drawing in the covering gas and directing it against the stator, thereby creating around the stator the cloud of gas which will generate the flotation. These turbines are simply constituted, in accordance with the prior art, of a rotor with mobile blades inside the cage of a stator with fingers of rectangular section. These units have a certain number of drawbacks:

a) instability of the flow rate of the air or gas due to the rupture of the diphasic flow profile in the rotor's stack; the rotor rotates in a diphasic water/air medium, which results in a considerable fluctuation in the electrical power absorbed;

b) periodic ascension of the vortex up to the air-induction point, leading to water being directed onto the froths, thereby inducing their partial redissolution;

c) the flotation effect is not assumed with turbines handling flow rates greater than 50 m³/hour, since the turbines only act as agitators because the depression created by the rotor is not sufficient to carry the covering gas to the stator; and d) impossibility of varying the ratio between the water flow rate and the air or gas flow rate.

For these reasons, even though the operation of these units at the pilot scale is acceptable, when the equipment described in the prior art is produced at industrial scale the flotation effect is not satisfactory.

SUMMARY OF THE PRESENT INVENTION

The cyclone-turbines in accordance with the invention are notably designed for separators constituted (FIG. 1) of a cylindrical tank divided by partitions into several distinct compartments: a compartment for homogenizing the feed flow rate (1), flotation cells (2) and a tranquilization compartment (3), possibly followed by a pot acting as the hydraulic seal with the exterior.

DETAILED DESCRIPTION

Each cell is equipped with a cyclone-turbine (4) and a skimming chute in common with an adjustable cell. It is preferred to associate the cyclone-turbines in accordance with the invention with self-stabilizing chutes (5), which can be displaced vertically by means of a skimming chamber (6), the fixed walls of which acts as a guide-support for the chute.

Figure 1:
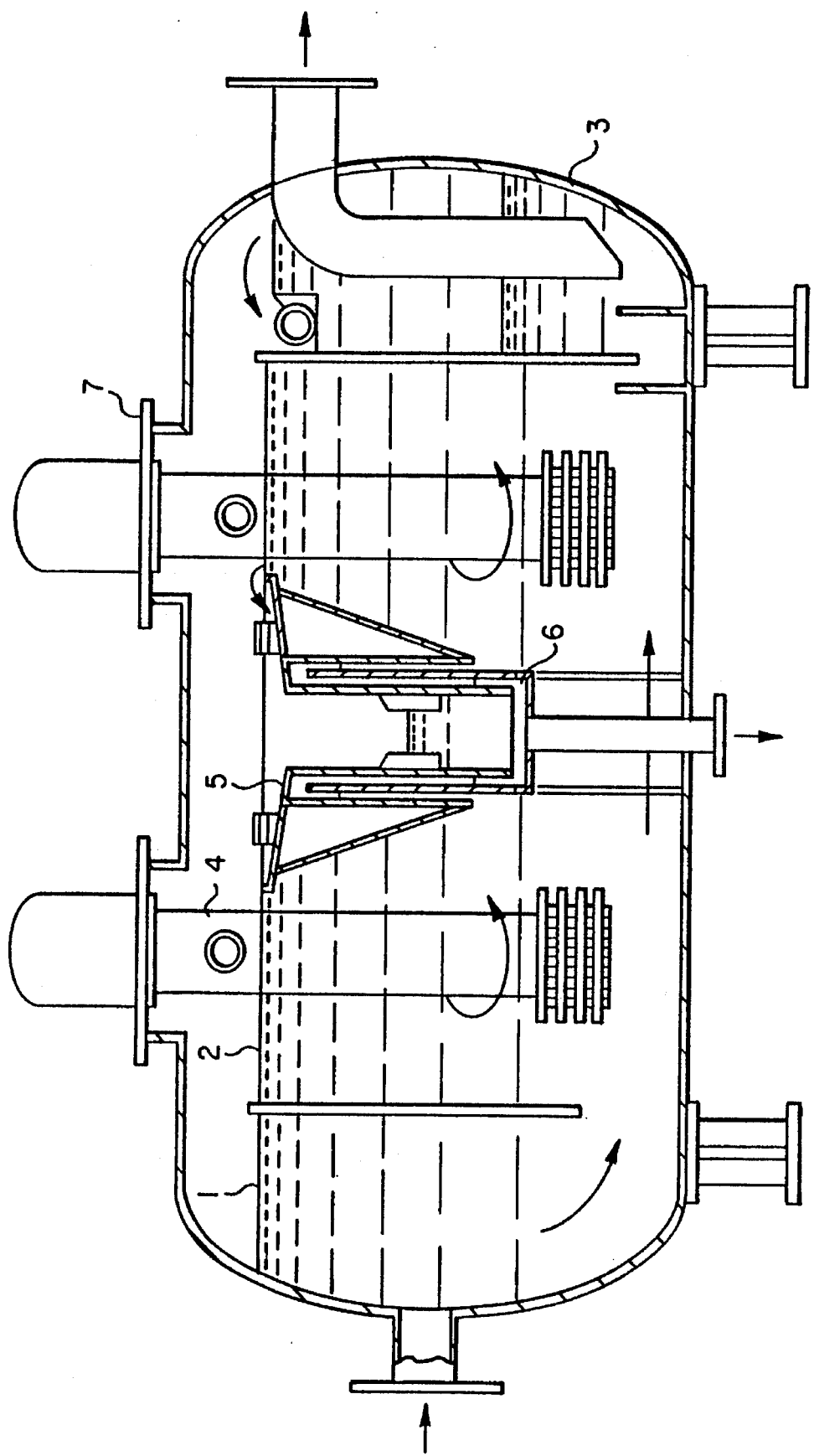
FIG. 1 is a sectional view of a flotation device incorporating the cyclone-turbine of the present invention.
Figure 2:
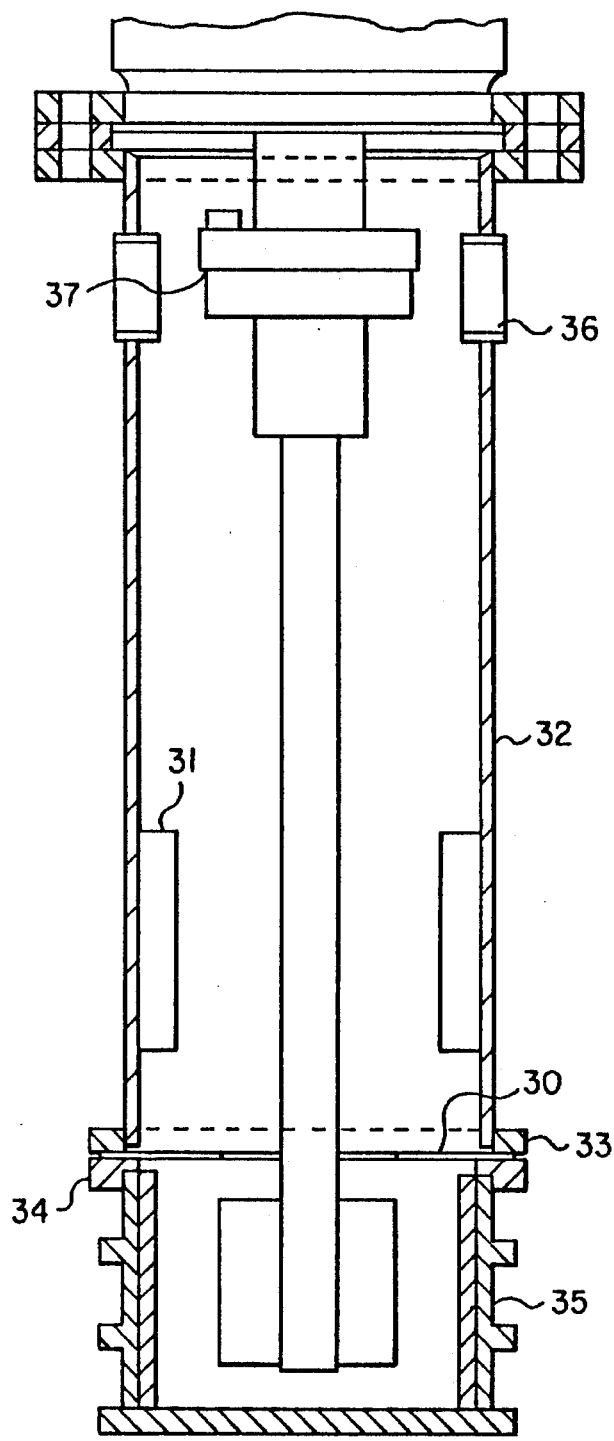
FIG. 2 is a cross-sectional view of a cyclone-turbine (4) of FIG. 1.
Figure 3:
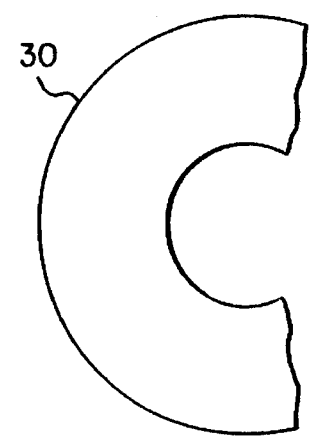
FIG. 3 is a partial plan view of throttling disk (30) of FIG. 2.

The cyclone-turbines (FIGS. 2 and 3) in accordance with the invention are the stator-rotor type. They are each equipped with a throttling disk (30) making it possible to create a depression which is sufficient to overcome the water column above the rotor. This disk (FIGS. 2 and 3) is several millimeters thick and is installed between the flanges of the stack and the squirrel cage stator (35). It is made of stainless steel and has a diameter approximately equal to the exterior diameter of the rotor. Baffles (31) are welded on the inside wall of the rotor's stack (32). These are preferably three baffles which are arranged symmetrically about thirty centimeters from the flange (33–34). The baffles are preferably made of steel. Indicatively, their dimensions are between 100×40×6 mm and 200×60×4 mm. These baffles make it possible to obtain a flow profile with a stable vortex. The combination of the tangential velocity of the rotor with the throttling disk and the vortex-stabilization baffles make it possible for the turbine to generate a regular diphasic gas/water flow. The water: gas flow rate ratio is on the order of three. The purpose of a stack crosspiece (36) is to prevent ascension of the vortex which would result in water being directed onto the froths formed on the exterior of the stack. It should be noted that the use of these improved turbine-cyclones is not limited to flotation devices but can be extended to any gas-liquid application.

The stator (35) of the cyclone-turbine in accordance with the invention is advantageously made of polypropylene; the rotor, which is made of common material (stainless steel) has a reduced number, preferably six, of blades. In addition, these cyclone-turbines are installed in a manner such that it is possible to put them in either a high or low position, with the high position being the ordinary position and the low position being obtained by inserting a piece between the coupling flanges (37). The thickness of this piece make it possible to act directly on the gas flow rate.

Created in this manner, these induced air injection devices are improved devices which make it possible to correctly control the air and gas flow rates and the water: air (gas) ratio, and to control the production and discharge of the froths. The materials used for these devices are light, their construction costs are low and their consumption of energy is reasonable.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by appended claims.

What is claimed is:

1. A cyclone-turbine comprising a stator cage, a stack thereabove, and a rotor in said stack having mobile blades inside said stator cage with fingers of a rectangular section, wherein a throttling disk is positioned between the said stator cage and the stack.

2. The cyclone-turbine of claim 1, wherein the said stack is equipped with baffles attached to its inside wall.

3. A flotation device for the separation of nonmiscible liquids, particularly the separation of water and hydrocarbon pollutants, comprising a cylindrical tank divided by partitions into a feed flow rate homogenization compartment in fluid flow communication with at least one flotation cell equipped with a cyclone-turbine and a skimming chamber wherein said cyclone-turbine is that of claim 1 or 2.

* * * * *

UNITED STATES PATENT AND TRADEMARK OFFICE
CERTIFICATE OF CORRECTION

PATENT NO. : 5,500,117
DATED : March 19, 1996
INVENTOR(S) : Adnan Hamdan

It is certified that error appears in the above-indentified patent and that said Letters Patent is hereby corrected as shown below:

Title page, item [73] Assignee: insert: CECA, S.A., France--.

Signed and Sealed this

Twenty-fourth Day of September, 1996

Attest:

BRUCE LEHMAN

*Attesting Officer*     *Commissioner of Patents and Trademarks*